US011194389B2

(12) United States Patent
Vanreenen et al.

(10) Patent No.: US 11,194,389 B2
(45) Date of Patent: Dec. 7, 2021

(54) FOVEATED RENDERING OF GRAPHICS CONTENT USING A RENDERING COMMAND AND SUBSEQUENTLY RECEIVED EYE POSITION DATA

(71) Applicant: QUALCOMM Incorporated, San Diego, CA (US)

(72) Inventors: Robert Vanreenen, San Diego, CA (US); Jonathan Wicks, Louisville, CO (US); Tate Hornbeck, Somerville, MA (US); Samuel Benjamin Holmes, Sterling, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/406,515

(22) Filed: May 8, 2019

(65) Prior Publication Data
US 2019/0391641 A1    Dec. 26, 2019

Related U.S. Application Data

(60) Provisional application No. 62/688,312, filed on Jun. 21, 2018.

(51) Int. Cl.
*G06F 3/01*  (2006.01)
*G06T 3/40*  (2006.01)
(Continued)

(52) U.S. Cl.
CPC ............... *G06F 3/013* (2013.01); *G06T 1/20* (2013.01); *G06T 3/40* (2013.01); *G06T 5/002* (2013.01); *G06T 5/20* (2013.01)

(58) Field of Classification Search
CPC .......... G06F 3/013; G06F 16/00; G06F 16/23; G06F 16/285; G06F 16/5866;
(Continued)

(56) References Cited

U.S. PATENT DOCUMENTS

2008/0078758 A1* 4/2008 Shimura ................. A63F 13/12
                                                              219/717
2014/0192066 A1* 7/2014 Savransky ............... G06T 1/20
                                                              345/506

(Continued)

OTHER PUBLICATIONS

Binstock A., "Optimizing VR Graphics with Late Latching," Mar. 1, 2015, Retrieved from the Internet: https://developer.oculus.com/blog/optimizing-vr-graphics-with-late-latching/, 9 Pages.

(Continued)

*Primary Examiner* — Ming Wu
(74) *Attorney, Agent, or Firm* — Procopio, Cory, Hargreaves & Savitch

(57) ABSTRACT

Example techniques are described for generating graphics content by obtaining a rendering command for a frame of the graphics content, obtaining an eye position of a user after obtaining the rendering command, determining a foveation parameter for a region of the graphics content based on the eye position; and rendering a tile, of the frame, corresponding to the region of the graphics content using the foveation parameter and the rendering command.

22 Claims, 9 Drawing Sheets

(51) Int. Cl.
*G06T 5/20* (2006.01)
*G06T 5/00* (2006.01)
*G06T 1/20* (2006.01)

(58) Field of Classification Search
CPC ...... G06F 16/954; G06F 16/955; G06F 3/011; G06F 3/0481; G06F 3/0482; G06F 3/04842; G06F 40/169; G02B 2027/0147; G02B 2027/0187; G02B 27/0172; G02B 2027/0138; G02B 27/017; G06T 3/0012; G06T 11/40; G06T 11/60; G06T 15/00; G06T 17/00; G06T 17/20; G06T 19/006; G06T 19/20; G06T 1/0007; G06T 1/20; G06T 1/60; G06T 2210/36; G06T 2219/024; G06T 2219/028; G06T 3/4038

See application file for complete search history.

(56) References Cited

U.S. PATENT DOCUMENTS

| | | | |
|---|---|---|---|
| 2016/0291689 A1* | 10/2016 | Smith | G06F 3/013 |
| 2016/0328816 A1 | 11/2016 | Boyd | |
| 2017/0262139 A1* | 9/2017 | Patel | G06F 40/169 |
| 2018/0033405 A1 | 2/2018 | Tall et al. | |
| 2018/0068640 A1 | 3/2018 | Martin | |
| 2018/0081178 A1* | 3/2018 | Shpunt | G06F 3/011 |
| 2018/0165792 A1 | 6/2018 | Tavakoli et al. | |

OTHER PUBLICATIONS

International Search Report and Written Opinion—PCT/US2019/037481—ISA/EPO—dated Sep. 5, 2019—15 pages.

* cited by examiner

FOVEATED RENDERING OF GRAPHICS CONTENT USING A RENDERING COMMAND AND SUBSEQUENTLY RECEIVED EYE POSITION DATA

This application claims the benefit of U.S. Provisional Patent Application 62/688,312 filed Jun. 21, 2018, the entire content of which is incorporated by reference.

BACKGROUND

An electronic device may execute a program to present graphics content on a display. For example, an electronic device may execute a virtual reality (VR) program or an augmented reality (AR) program.

In some applications, graphics presented at a display may be rendered at different resolutions in the same frame. For example, a VR headset may track a gaze of a user (e.g., using a sensor) to identify a graphics portion that will be in the user's foveal vision. If the VR headset determines that eye movement of the user follows a particular object presented at a display or indicates the user's foveal vision covers one or more regions, the electronic device may render corresponding region(s) (e.g., of the object) at a higher resolution and render other regions in lower resolution(s).

SUMMARY

Methods, devices, apparatus, and computer-readable media for generating graphics content are described herein. A method can include obtaining a rendering command for a frame of the graphics content, obtaining an eye position of a user after obtaining the rendering command, determining a foveation parameter for a region of the graphics content based on the eye position, and rendering a tile, of the frame, corresponding to the region of the graphics content using the foveation parameter and the rendering command.

In some embodiments, the method can further include generating the frame of the graphics content based on multiple tiles comprising the tile, where the frame of graphics content is displayed on a virtual reality headset or a cellular handset.

In additional embodiments, the method can be performed using a graphics processing unit, and the graphics processing unit can obtain the rendering command from a central processing unit. The graphics processing unit can also obtain the eye position from a shared buffer that is shared with a processor that is different than the graphics processing unit and the central processing unit. The graphics processing unit, the central processing unit, and the processor can be on the same device or different devices.

In further embodiments, the eye position can be used to determine foveation parameters for each tile that corresponds to the frame of graphics content.

In some implementations, the method can further include obtaining a second rendering command for the frame of the graphics content, obtaining a second eye position of the user after rendering the tile, determining a second foveation parameter for a second region of the graphics content based on the second eye position, and rendering a second tile, of the frame, corresponding to the second region of the graphics content using the second foveation parameter and the second rendering command for the frame of the graphics content.

In additional implementations, the region can be determined to be in the foveal vision of a user, and the tile can be rendered at a higher resolution than other tiles correspond to the frame of the graphics content based on the foveation parameter.

In further implementations, the region can be determined to be in the peripheral vision of a user, and the tile can be rendered at a lower resolution than other tiles correspond to the frame of the graphics content based on the foveation parameter.

In some embodiments, the foveation parameter can correspond to a resolution, an antialiasing level, a blurring level, and/or a filter.

A device can include a memory and a processor coupled to the memory configured to cause the device to perform a method that includes obtaining a rendering command for a frame of graphics content, obtaining an eye position of a user after obtaining the rendering command, determining a foveation parameter for a region of the graphics content based on the eye position, and rendering a tile, of the frame, corresponding to the region of the graphics content using the foveation parameter and the rendering command.

In some embodiments, the device can be a virtual reality headset or a cellular handset.

A computer-readable medium can be a non-transitory computer-readable medium that stores a program containing instructions that, when executed by a processor of a device, cause the device to perform a method that includes obtaining a rendering command for a frame of graphics content, obtaining an eye position of a user after obtaining the rendering command, determining a foveation parameter for a region of the graphics content based on the eye position, and rendering a tile, of the frame, corresponding to the region of the graphics content using the foveation parameter and the rendering command.

An apparatus can include means for obtaining a rendering command for a frame of graphics content, means for obtaining an eye position of a user after obtaining the rendering command, means for determining a foveation parameter for a region of the graphics content based on the eye position, and means for rendering a tile, of the frame, corresponding to the region of the graphics content using the foveation parameter and the rendering command.

DETAILED DESCRIPTION

Figure 1:
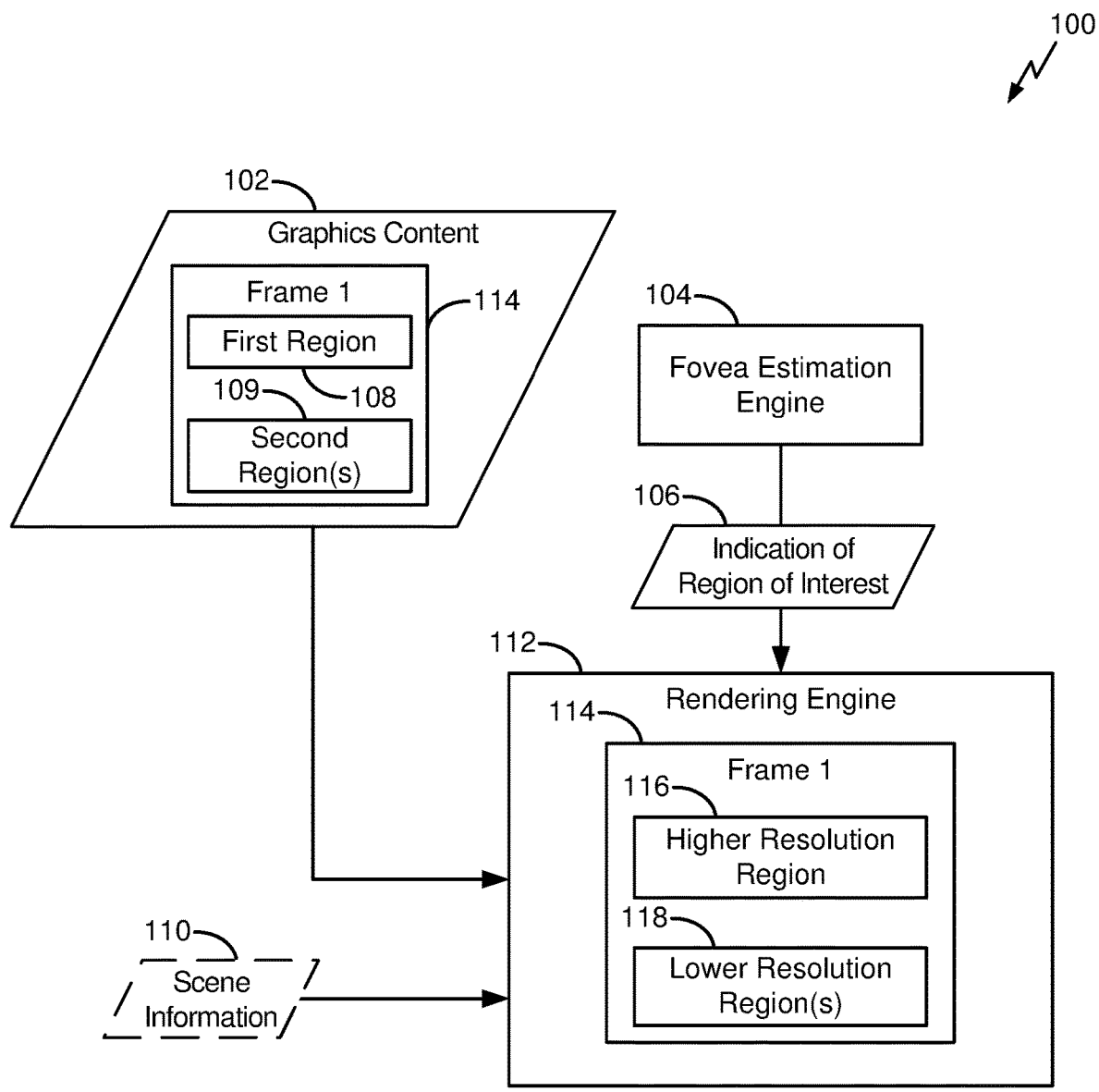
FIG. 1 is an example diagram of a device that can perform foveated rendering, consistent with disclosed embodiments.

The systems, devices, computer-readable media, and methods disclosed herein may provide approaches for rendering regions of frames of computer graphics content differently based on a position of one or more eyes of a user relative to a coordinate system and/or a device (hereinafter, an "eye position"). For example, one or more higher resolution regions and one or more lower resolutions regions may be rendered in the same image/frame. As used herein, a higher resolution may be any region that is greater than a lower resolution region. In various embodiments, a higher resolution can be, for example, 1400×1200 pixels, 1080× 1200 pixels, etc. and lower resolutions can be, for example, one half, one quarter, one eighth, one sixteenth, etc. of the higher resolution. These resolutions are merely examples and are not intended to be limiting. In some embodiments, a higher resolution can represent a full resolution of a display device and lower resolutions can be fractional resolutions of the full resolution. In other embodiments, a higher resolution can be greater or less than a full resolution of a particular display device and the higher resolution may be downsampled or upscaled before being displayed on the particular display device. In further embodiments, other rendering parameters can be different across regions of the same frame, such as antialiasing (AA) levels, blurring levels, filters used, levels of geometric detail, texture mipmap levels, and the like.

As used herein, a "region" of the graphics content can refer to a regular grid in optical space corresponding to a subset of a frame of the graphics content. In some embodiments, the regions can be the same for each frame of the graphics content. For example, each frame of the graphics content can be segmented into the same 64 regions. In other embodiments, the number and shapes of the regions can vary from frame to frame in the graphics content.

Rendering inefficiency may be one current technical problem in computer graphics rendering. For example, generating graphics content using a VR program, application, and/or device may include rendering two views of graphics content, which may make content twice as slow to render (potentially causing some latency, limiting available bandwidth on hardware component buses, affecting the displayed frame rate, affecting the motion-to-photon latency, etc.) and/or cause a device to utilize more power. One approach to solve the technical problem may be to render a region of the graphics content using parameters that utilize more processing resources (e.g., at a higher resolution) and render the other region(s) of the scene using parameters that utilize fewer processing resources (e.g., at one or more lower resolutions).

For example, in some instances, the user may be primarily focused on the center of the graphics content. Thus, the outer portions are more likely to be in the user's peripheral vision such that, for example, the user's visual system cannot recognize artifacts and/or appreciate detail at the same levels as in the center of the graphics content. Accordingly, the user's experience may not be negatively impacted by rendering the outer regions at one or more lower resolutions and rendering efficiency is gained by not rendering those regions at a higher resolution.

In some instances, identifying the region of the user's gaze may involve performing eye tracking to determine a region of the graphics content in the user's foveal vision. As used herein, a user's foveal vision can refer to vision in the center of the user's field of vision, where visual acuity is usually the highest. As additionally used herein, a region of graphics content in (or determined to be in) the user's foveal vision can refer to a region of the graphics content that represents the intersection of a projection of the user's foveal vision and a two-dimensional cross section of the graphics content that intersects the projection.

Once the region of the graphics content in the user's foveal vision is determined, this approach may include rendering the region at a higher resolution and rendering the other region(s) of the scene at one or more lower resolutions. Again, because the regions in the user's foveal vision remain in higher resolution, the user's experience may not be negatively impacted by rendering the region(s) in the user's peripheral vision at one or more lower resolutions and rendering efficiency is gained by not rendering those region(s) at a higher resolution. As used herein, a user's peripheral vision can refer to vision that is outside of the user's foveal vision.

As used herein, "foveated rendering" can refer to the process of rendering different regions of a scene based on different foveation parameters. The foveation parameters can include, but are not limited to, resolutions, AA levels, blurring levels, filters to apply, levels of geometric detail, and texture mipmap levels.

As further used herein, a "foveated region" can refer to a region in one or more frames of graphics content that is rendered using parameters that utilize more processing resources. In some embodiments, a foveated region can be determined based on the region being determined, predicted, and/or presumed to be within the user's foveal vision. For example, foveated regions can be regions that are rendered at higher resolutions, with higher AA levels, with lower blurring levels, with filters to improve the quality of the region, at higher levels of geometric detail, at higher texture mipmap levels, and the like. In some embodiments, foveated regions can be adjusted based on sensor readings other than eye position/coordinates. For example, foveation parameters discussed herein can be lowered based on a determination that the user's eye(s) are not fully open. In contrast, "non-foveated regions" can refer to regions in one or more frames of graphics content that are rendered using parameters that utilize fewer processing resources. In some embodiments, a non-foveated region can be determined based on the region not being determined, predicted, and/or presumed to be within the user's foveal vision (e.g., within the user's peripheral vision). For example, non-foveated regions can be regions that are rendered at lower resolutions, with lower AA levels, with higher blurring levels, with filters to improve processing efficiency, at lower levels of geometric detail, at lower texture mipmap levels, and the like.

Another technical problem in computer graphics rendering, particularly in VR applications, is motion-to-photon latency. Motion-to-photon latency can be described as the time needed for a user's movement to be reflected on a display screen. If motion-to-photon latency is high (e.g., greater than 20 milliseconds (ms)), the user's experience may be negatively impacted because the display screen may not accurately reflect what the user expects to be on the screen based on their movement and/or the user may experience visual artifacts caused by the user's gaze moving to a region that was rendered based on the region being determined to be within the user's peripheral vision (e.g., rendered at a lower resolution or using parameters for more efficient/less detailed display). These effects can cause the user to experience disorientation and/or motion sickness, and may also break the VR experience for the user.

Motion-to-photon latency may also decrease the user experience in other applications that use eye or head tracking for foveated rendering such as mobile gaming applications, or applications displayed on very large screens.

As discussed in further detail below, these technical problems can be solved using eye position data received after a rendering command is generated. Because the user's eye position is obtained after the graphics commands are sent to a graphics processor (e.g., a graphics processing unit (GPU)), the portion of graphics content is more likely to be rendered based on the user's current eye position. This provides the improved efficiency of foveated rendering while reducing eye motion-to-photon latency.

Various configurations are now described with reference to the FIGs., where like reference numbers may indicate functionally similar elements. The systems and methods as generally described and illustrated in the FIGs. herein could be arranged and designed in a wide variety of different configurations. Thus, the following more detailed description of several configurations, as represented in the FIGs., is not intended to limit scope, as claimed, but is merely representative of the systems and methods.

FIG. 1 depicts an illustrative example of a device 100 that can perform foveated rendering. The device 100 may include or be included in a graphics processing unit (GPU) or any other type of processing unit (e.g., a central processing unit (CPU) or a digital signal processor (DSP)) that is configured to perform a graphics processing operation using the graphics content 102, as an illustrative example. In some examples, the graphics content 102 may correspond to graphics content from an AR, a VR application, and/or a mixed reality application.

The graphics content 102 can include one or more frames, such as a first frame 114. The first frame 114 may include a first region 108 and one or more second regions 109. In various embodiments, the graphics content 102 can be generated based on a state of an AR or a VR application, based on position information of the device 100 (e.g., based on global positioning system (GPS) coordinates, local coordinates, locations of real-world objects, etc.), based on an orientation of the device 100, and/or based on determined motion of the device 100, a user (e.g., head or eye position), or a real-world object captured by a camera (not pictured) of the device 100. In some embodiments, the device 100 can include a fovea estimation engine 104.

The device 100 can further include a rendering engine 112 that performs foveated rendering of graphics content 102. For example, the first region 108 of the first frame 114 may be a region that is rendered in a higher resolution. Accordingly, the first frame 114 in the rendering engine 112 can include a higher resolution region 116 that is based on the first region 108 of the first frame 114 of the graphics content 102. Additionally, the second region(s) 109 of the first frame 114 may be region(s) that is/are rendered at lower resolution(s). For example, all of the second region(s) can be rendered at one fourth of the higher resolution, one of the second regions can be rendered at one half of the higher resolution and another of the second regions can be rendered at one eighth of the higher resolution, etc. The first frame 114 in the rendering engine 112 can include one or more lower resolution regions 118 that is based on the one or more second regions 109 of the first frame 114 of the graphics content 102.

In some implementations, the rendering engine 112 may be, may include, or may be part of a GPU or another type of processor.

In some embodiments, the fovea estimation engine 104 may be configured to generate an indication of a region of interest 106 (e.g., the first region 108) of the graphics content 102. For example, the fovea estimation engine 104 may receive eye position information from a sensor (not pictured) and determine a region of interest within a display that is within a user's foveal vision. For example, the eye position data can include an estimated direction of the user's gaze, as well as other sensor readings, such as coordinates of the user's pupil or a measure of the user's eye's openness. In some embodiments, the region of interest may be associated with the first region 108 of the first frame 114. The fovea estimation engine 104 can send an indication of the region of interest 106 to the rendering engine 112, and the rendering engine 112 can determine that the first region 108 should be the higher resolution region 116 and the second region(s) 109 (not in the region of interest) should be the one or more lower resolution regions 118.

In some implementations, the fovea estimation engine 104 may be part of the same processor as the rendering engine 112 while, in other implementations, the fovea estimation engine 104 may part of a separate processor.

In some examples, e.g., when the graphics content 102 and the device 100 correspond to an AR application, the device 100 may receive scene information 110. For example, the scene information 110 may be captured by a camera (not pictured) of the device 100, and the device 100 may superimpose the graphics content 102 on the scene information 110.

Figure 2:
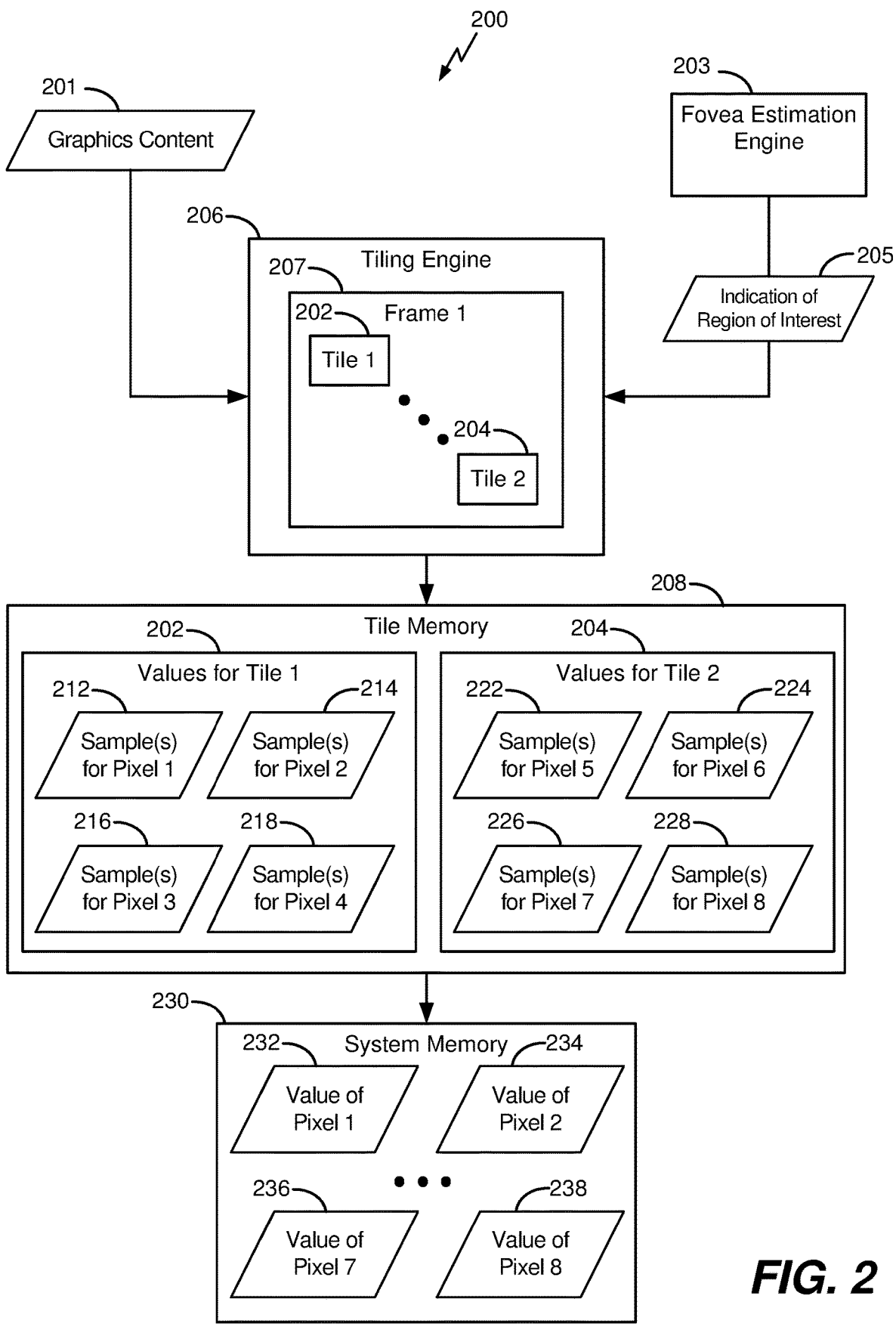
FIG. 2 is an example diagram of a device that can perform foveated rendering, consistent with disclosed embodiments.

Referring to FIG. 2, an illustrative example of a device 200 that can perform foveated rendering is depicted. In various embodiments, the device 200 can be the same or similar to the device 100 in FIG. 1. In the example of FIG. 2, the device 200 can be configured to render graphics content using tiled rendering and, accordingly, can include a tiling engine 206.

As described herein, tiled rendering can refer to a process of segmenting a frame of graphics content by a regular grid in optical space and rendering each section of the grid (i.e., each tile) separately. Using tiled rendering can provide technical advantages because the amount of memory and bandwidth may be reduced compared to rendering systems that draw the entire frame at once. Accordingly, tiled rendering may be useful in any type of device that can generate a display (e.g., laptop computers, desktop computers, advanced driver assistance systems, etc.), but is particularly common in mobile devices, such as cellular handsets (e.g., smartphones), VR and/or AR headsets, smart glasses, smartwatches, and the like.

As used herein, a "tile" can refer to the grid in optical space (e.g., a 16×16 or a 32×32 grid of pixels) and/or a "tile" can refer to a section of tile memory where the samples values associated with the grid in optical space are stored.

As used herein, a "sample" or a "sample value" can refer to a value that represents the intersection of a channel (e.g., red, green, or blue) and a pixel. In some embodiments, reference to a sample can include a sample with multiple subsamples. For example, in red, green, blue (RGB) color space, a sample can include 3 subsamples, and in red, green, blue, alpha, (RGBA) color space, a sample can include 4 subsamples.

In some embodiments, the tiling engine 206 can be part of a rendering engine (e.g., the rendering engine 112 in FIG. 1). As shown in FIG. 2, the tiling engine 206 can receive graphics content 201. In some embodiments, the tiling engine 206 may also receive an indication of a region of interest 205 from a fovea estimation engine 203.

The tiling engine 206 can be configured to perform a tiling process associated with processing of the graphics content 201. The tiling process may include determining a set of tiles associated with the graphics content 201. For example, each frame of the graphics content 201 can be segmented into regions, where each region corresponds to a tile, multiple regions correspond to a tile, and/or a tile corresponds to multiple regions. To illustrate, FIG. 2 depicts that a first frame 207 may be segmented into a set of tiles that includes a first tile 202 (e.g., a first region of the first frame 207) and a second tile 204 (e.g., a second region of the first frame 207). The first frame 207 may include additional tiles for addition regions in the first frame 207.

In the example of FIG. 2, the tiling engine 206 may be configured to render samples of the graphics content 201 as a set of values for each tile associated with the first frame 207 (e.g., by performing an operation (for example, a vertex shading operation, a texture operation, a rasterization operation, one or more other operations, or a combination thereof) to determine a value for one or more samples for each pixel in the region associated with the tile). In some embodiments, a value of a sample may be associated with a color value (e.g., an RGB color value) and may be determined based on a location of the sample in the frame of the graphics content and objects that overlap that location in the frame. As used herein, a "pixel" can refer to a pixel in the final display (e.g., a 1920×1080 display has 2,073,600 pixels). Additionally, as also used herein, a "pixel" can refer to data in memory that ultimately corresponds to one pixel in the final display (if the resolution of the display is the same as in memory), more than one pixel in the final display (if the resolution of the display is larger than in memory), or less than one pixel and/or part of one pixel in the final display (if the resolution of the display is smaller than in memory).

Each tile can be rendered separately, values can be generated for each sample, and the values can be stored in a tile memory 208. In some embodiments, multi-sample antialiasing (MSAA) may be used. In MSAA, multiple samples can be associated with each pixel location in a display, and a value can be generated for each sample. For example, the tile memory 208 can include values for the first tile 202, which can include a sample or multiple samples for a first pixel 212, a sample or multiple samples for a second pixel 214, a sample or multiple samples for a third pixel 216, and a sample or multiple samples for a fourth pixel 218. Additionally, the tile memory 208 can include values for the second tile 204, which can include a sample or multiple samples for a fifth pixel 222, a sample or multiple samples for a sixth pixel 224, a sample or multiple samples for a seventh pixel 226, and a sample or multiple samples for an eighth pixel 228.

In some embodiments, the samples can then be stored in a system memory 230. For example, the one or more samples for the first pixel 212 can be stored as a value for the first pixel 232 in the system memory 230, the one or more samples for the second pixel 214 can be stored as a value for the second pixel 234 in the system memory 230, the one or more samples for the seventh pixel 226 can be stored as a value for the seventh pixel 236 in the system memory 230, and the one or more samples for the eighth pixel 228 can be stored as a value for the eighth pixel 238 in the system memory 230. The samples for the third-sixth pixels may also be stored as values in the system memory 230.

In further embodiments, the samples can additionally or alternatively be stored in other types of memory, such as, for example, local GPU memory (GMEM) or cache memory.

If MSAA is used, the samples may be downsampled to generate the value of a pixel (e.g., RGB color values). For example, if 2×MSAA is used, there may be two samples determined for each pixel in a display. When the values are transferred to, for example, the system memory 230, the samples may be downsampled (e.g., averaged together) to determine the value of the pixel in the system memory 230. In some embodiments, some tiles (e.g., tiles associated with a lower resolution) may have samples determined at a lower resolution than the display. Thus, the sample values may be upscaled to match the resolution of the display.

The values of the pixels stored in the system memory 230 can then be used to generate a display. For example, the values can indicate RGB color values of pixels, and the pixels can be set accordingly to generate the display.

The example of FIG. 2 illustrates aspects of a tiled rendering to generate graphics content. Alternatively or additionally other techniques may be used to generate the graphics content, consistent with disclosed embodiments.

Figure 3:
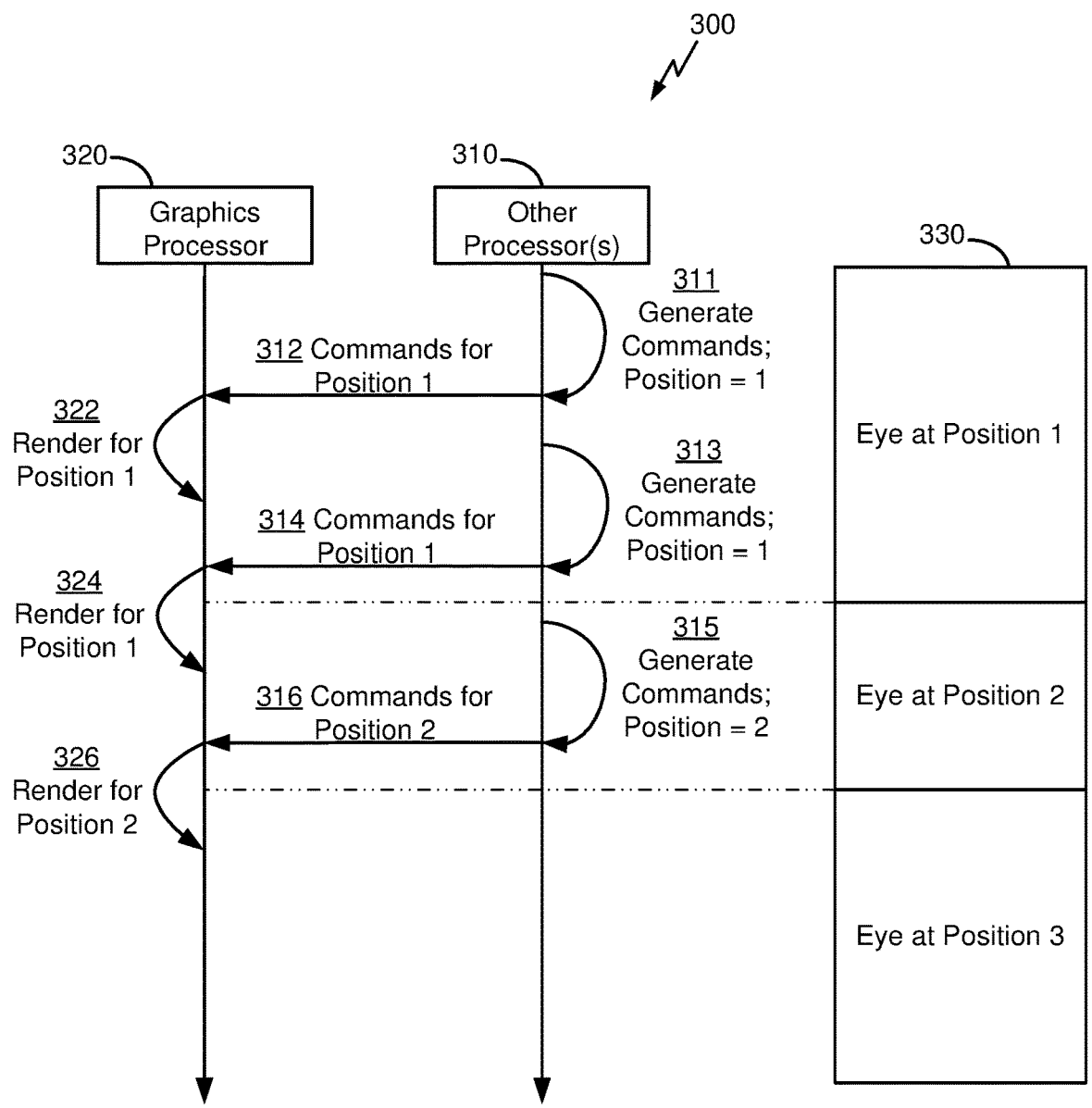
FIG. 3 is an example illustration of foveated rendering based on eye position, consistent with disclosed embodiments.

Referring to FIG. 3, an example process 300 of foveated rendering based on eye position is shown. In various embodiments, the process 300 can be performed using a graphics processor 320 (e.g., a GPU) and one or more other processors 310 (e.g., a CPU, a GPU, a DSP, and the like) of a device (e.g., the device 100 in FIG. 1 and/or the device 200 in FIG. 2). As shown in FIG. 3, boxes 330 can represent changing positions over time of a user's eye while viewing graphics content. In some embodiments, position 1, position 2, and position 3 can represents coordinates (e.g., x, y, and/or z coordinates) corresponding to the location of the user's gaze within the graphics content, regions of the graphics content currently associated with the user's gaze, and/or objects of interest corresponding to the user's gaze within the graphics content.

At element 311, the one or more other processors 310 can determine that the user's eye is at position 1 (as shown in the boxes 330) and generate rendering commands based on eye position 1 and instructions from an application generating graphics content (e.g., a VR application).

At element 312, the one or more other processors 310 can send the generated commands for eye position 1 to the graphics processor 320.

At element 322, the graphics processor 320 can render graphics content for the application based on the commands for eye position 1. Accordingly, in some embodiments, a region of the graphics content at eye position 1 may be rendered as a foveated region (e.g., at a higher resolution than other regions of the graphics content). As shown in FIG. 3, at the time the graphics processor 320 finishes rendering the graphics content at the element 322, the eye position of the user remains at eye position 1. Thus, the position of the user's gaze corresponds to the foveated region, and the user may view a higher quality image and/or may not see noticeable artifacts in that frame of graphics content.

At element 313, the one or more other processors 310 can determine that the user's eye is at position 1 (as shown in the boxes 330) and generate rendering commands based on eye position 1 and instructions from the application generating graphics content.

At element 314, the one or more other processors 310 can send the generated commands for eye position 1 to the graphics processor 320.

At element 324, the graphics processor 320 can render graphics content for the application based on the commands for eye position 1. As shown in FIG. 3, at the time the graphics processor 320 finishes rendering the graphics content at the element 324, the eye position of the user has moved to eye position 2. Thus, the position of the user's gaze may not correspond a foveated region and/or may correspond to a non-foveated region, and the user may observe a lower quality image and/or noticeable artifacts in that frame of graphics content.

At element 315, the one or more other processors 310 can determine that the user's eye is at position 2 (as shown in the boxes 330) and generate rendering commands based on eye position 2 and instructions from the application generating graphics content.

At element 316, the one or more other processors 310 can send the generated commands for eye position 2 to the graphics processor 320.

At element 326, the graphics processor 320 can render graphics content for the application based on the commands for eye position 2. As shown in FIG. 3, at the time the graphics processor 320 finishes rendering the graphics content at the element 326, the eye position of the user has moved to eye position 3. Thus, the position of the user's gaze may not correspond to a foveated region, and the user may continue to observe a lower quality image and/or noticeable artifacts in that frame of graphics content.

In the above example, because the user's eye position does not necessarily correspond to the foveated regions of the graphics content, the user may experience motion-to-photon latency that could result in disorientation, motion sickness, and/or an overall reduced user experience.

Figure 4:
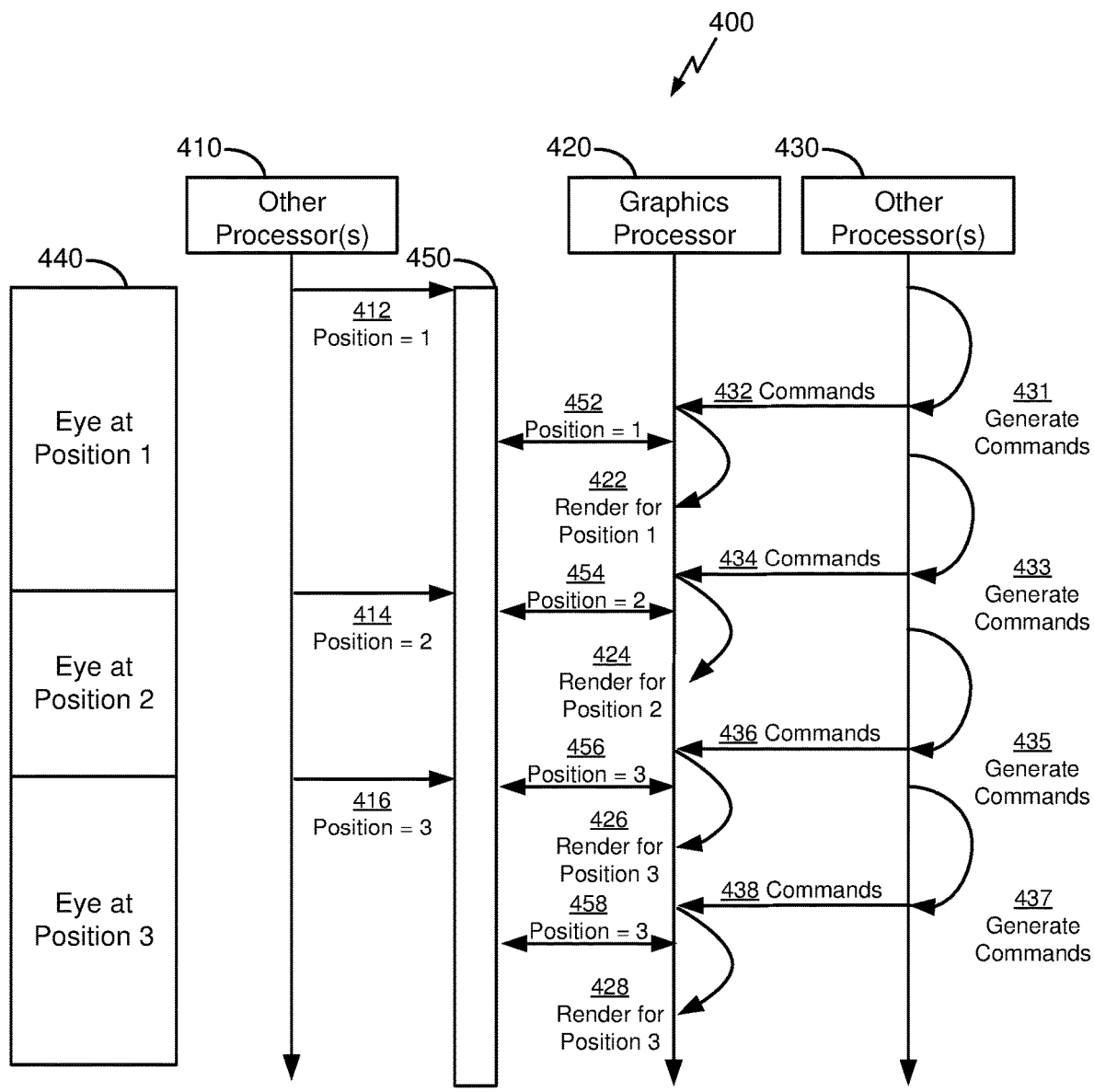
FIG. 4 is an example illustration of foveated rendering based on eye position, consistent with disclosed embodiments.

Referring to FIG. 4, an example process 400 of foveated rendering based on eye position is shown. In various embodiments, the process 400 can be performed using a graphics processor 420 (e.g., a GPU), one or more other processors 410 and 430 (e.g., CPUs, GPUs, DSPs, or a combination thereof, and the like) of a device (e.g., the device 100 in FIG. 1 and/or the device 200 in FIG. 2). The one or more processors 410 and 430 can, in various embodiments, represent the same processor (e.g., a CPU), can each represent a single processor, can represent multiple processors, etc. Additionally, the one or more processors 410 and 430 may be on the same device as each other and the graphics processor 420 or can be on different devices in communication with each of the other device(s) (e.g., connected via a wired or wireless connection). As shown in FIG. 4, boxes 440 can represent changing positions over time of a user's eye while viewing graphics content. In some embodiments, position 1, position 2, and position 3 can represents coordinates (e.g., x, y, and/or z coordinates) corresponding to the location of the user's gaze within the graphics content, regions of the graphics content currently associated with the user's gaze, and/or objects of interest corresponding to the user's gaze within the graphics content.

At element 412, the one or more processors 410 can determine that the user's eye is at position 1 (as shown in the boxes 440) and store an indication of the user's eye position in a shared buffer 450. In some embodiments, the one or more other processors 410 can continuously or at set intervals (e.g., every 5 ms) determine the eye position of the user and update the shared buffer 450 when the eye position changes. In various embodiments, the eye position data stored in a shared buffer can include an estimated direction of the user's gaze, as well as other sensor readings, such as coordinates of the user's pupil or a measure of the user's eye's openness.

At element 431, the one or more other processors 430 can generate rendering commands without using an eye position and based on instructions from an application generating graphics content (e.g., a VR application). In some embodiments, the one or more other processors 430 can, at the element 431, generate high level foveation parameters, as discussed in further detail below with regard to FIGS. 5-8. The high level foveation parameters can, in some implementations, be part of the generated commands or, in other implementations, be separate data.

At element 432, the one or more other processors 430 can send the generated commands with the high level foveation parameters to the graphics processor 420.

At element 422, the graphics processor 420 can start rendering graphics content for the application based on the commands received. While rendering the graphics content, the graphics processor 420 can, at element 452, retrieve the eye position of the user (position 1) from the shared buffer 450. Accordingly, the eye position is retrieved later than if the eye position was used to generate the commands at the element 431 (e.g., several milliseconds earlier). The graphics processor 420 can then use the eye position 1 with the high level foveation parameters to finish rendering the graphics content for eye position 1.

As shown in FIG. 4, at the time the graphics processor 420 finishes rendering the graphics content at the element 422, the eye position of the user remains at eye position 1. Thus, the position of the user's gaze corresponds to the foveated region, and the user may view a higher quality image and/or may not observe noticeable artifacts in that frame of graphics content.

At element 433, the one or more other processors 430 can generate rendering commands without using an eye position and based on instructions from the application generating graphics content. In some embodiments, the one or more other processors 430 can, at the element 433, generate high level foveation parameters.

At element 434, the one or more other processors 430 can send the generated commands with the high level foveation parameters to the graphics processor 420.

At element 424, the graphics processor 420 can start rendering graphics content for the application based on the commands received.

At element 414, the one or more other processors 410 can determine that the user's eye is at position 2 (as shown in the boxes 440) and store an indication of the user's eye position in the shared buffer 450.

While rendering the graphics content at the element 424, and after the element 414, the graphics processor 420 can, at element 454, retrieve the eye position of the user (position 2) from the shared buffer 450. Accordingly, the eye position is retrieved later than if the eye position was used to generate the commands at the element 433 (e.g., several milliseconds earlier). Additionally, the eye position changed from the eye position 1 to the eye position 2 after the commands were generated at the element 433. Accordingly, the graphics processor 420 can then use the eye position 2 with the high level foveation parameters to finish rendering the graphics content for eye position 2.

As shown in FIG. 4, at the time the graphics processor 420 finishes rendering the graphics content at the element 424, the eye position of the user has changed since the commands were generated at the element 433. Thus, even though the commands were generated before the user's gaze changed, the position of the user's gaze still corresponds to the foveated region, and the user may view a higher quality image and/or may not observe noticeable artifacts in that frame of graphics content. This may be an improvement compared to the process shown in FIG. 3, where the eye position when the commands are generated is used to render the graphics content.

At element 435, the one or more other processors 430 can generate rendering commands without using an eye position and based on instructions from the application generating graphics content. In some embodiments, the one or more other processors 430 can, at the element 435, generate high level foveation parameters.

At element 436, the one or more other processors 430 can send the generated commands with the high level foveation parameters to the graphics processor 420.

At element 426, the graphics processor 420 can start rendering graphics content for the application based on the commands received.

At element 416, the one or more other processors 410 can determine that the user's eye is at position 3 (as shown in the boxes 440) and store an indication of the user's eye position in the shared buffer 450.

While rendering the graphics content at the element 426, and after the element 416, the graphics processor 420 can, at element 456, retrieve the eye position of the user (position 3) from the shared buffer 450. Accordingly, the eye position is retrieved later than if the eye position was used to generate the commands at the element 435 and the eye position changed from the eye position 2 to the eye position 3 after the commands were generated at the element 435. Accordingly, the graphics processor 420 can then use the eye position 3 with the high level foveation parameters to finish rendering the graphics content for eye position 3.

At element 437, the one or more other processors 430 can generate rendering commands without using an eye position and based on instructions from the application generating graphics content. In some embodiments, the one or more other processors 430 can, at the element 437, generate high level foveation parameters.

At element 438, the one or more other processors 430 can send the generated commands with the high level foveation parameters to the graphics processor 420.

At element 428, the graphics processor 420 can start rendering graphics content for the application based on the commands received. While rendering the graphics content at the element 428, the graphics processor 420 can, at element 458, retrieve the eye position of the user (position 3) from the shared buffer 450. Because, the eye position did not move from when the eye position was retrieved in the element 456 until when the eye position was retrieved in the element 458, the graphics processor 420 may retrieve the same value from the shared buffer 450. In other words, the shared buffer 450 was not updated by the one or more other processors 410 between the element 456 and the element 458. Accordingly, the graphics processor 420 can again use the eye position 3 with the high level foveation parameters to finish rendering the graphics content for eye position 3.

Figure 5:
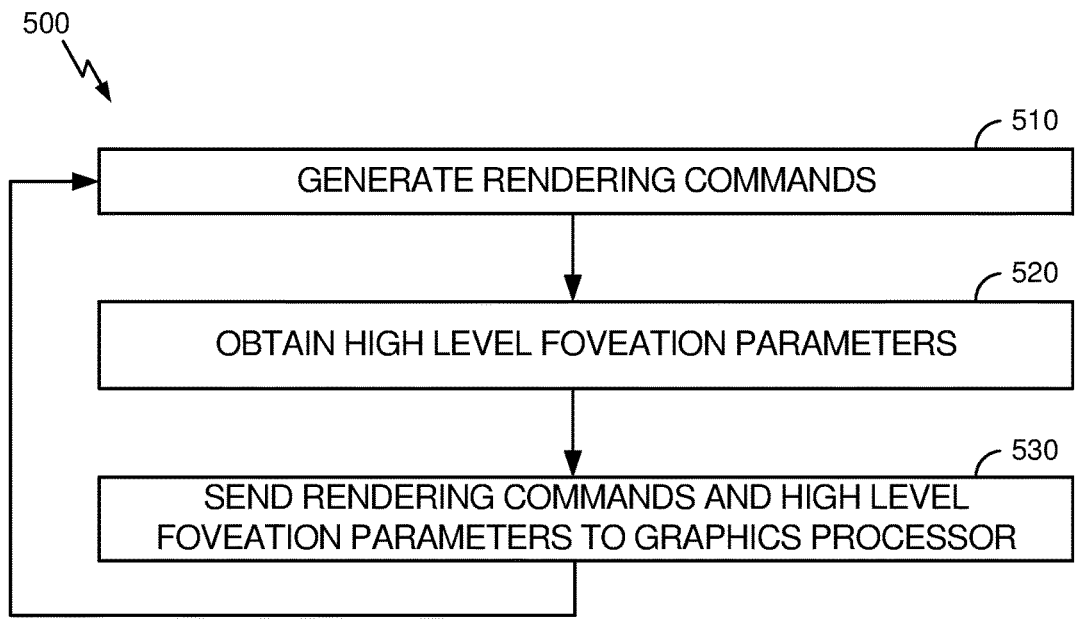
FIG. 5 is an example illustration of using high level foveation parameters, consistent with disclosed embodiments.

Referring to FIG. 5, an example process 500 of using high level foveation parameters is shown. In various embodiments, the example process 500 can be performed by a computing device, such as the device 100 depicted in FIG. 1, the device 200 depicted in FIG. 2, or a device 900 described below with regard to FIG. 9. In further embodiments, the example process 500 can be performed using one or more processors, such as a CPU, a DSP, and/or a GPU. For example, the process 500 can be performed by the one or more other processors 430 shown in FIG. 4. Additionally or alternatively, in some embodiments, the computing device can be a VR headset, an AR headset, a cellular handset (or other wireless communication device), a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 510, the processor can generate rendering commands for rendering a frame of graphics content. In some embodiments, the rendering commands can include samples from an application (e.g., a VR application, mobile gaming applications, or applications displayed on large screens) and instructions including, for example, instructions to downscale the samples, instructions on how to downscale the samples (e.g., how to weight the samples), instructions to upscale the samples, etc. In further embodiments, the rendering commands can be obtained from the application.

In block 520, the processor can obtain high level foveation parameters. In some embodiments, the high level foveation parameter can be received from the application, while, in other embodiments, the high level foveation parameters can be generated by the computing device. In various embodiments, the high level foveation parameters can be conditional modifications to the generated rendering comments, where the condition is based on an eye position that is retrieved at a later time (e.g., when the rendering based on the rendering commands occurs).

In some implementations, the high level foveation parameters can include a look up table, where the index is the eye position, and the index is used to retrieve equations, images, textures, etc. associated with the eye position. The equations can be equations to render regions of graphic content at a higher resolution, at a lower resolution, using a specified AA level, using a specified blurring level, using a specified filter, at a specific level of geometric detail, at a specific texture mipmap level, and the like. The high level foveation parameters may be later used with the generated rendering commands (and/or included as part of the generated rendering commands) and with an eye position that is retrieved at a later time to render the graphics content with foveated and non-foveated regions that correspond to the eye position. For example, regions that are associated with the current eye position (i.e., in the user's foveal vision) may be rendered at a higher resolution than regions that are not associated with the current eye position (i.e., in the user's peripheral vision).

In block 530, the processor can send the rendering commands and the high level foveation parameters, which can be part of the rendering commands, to a graphics processor (e.g., a GPU, a CPU, a DSP, etc.). The example process 500 can then return to the block 510 for the next frame of the graphics content.

Figure 6:
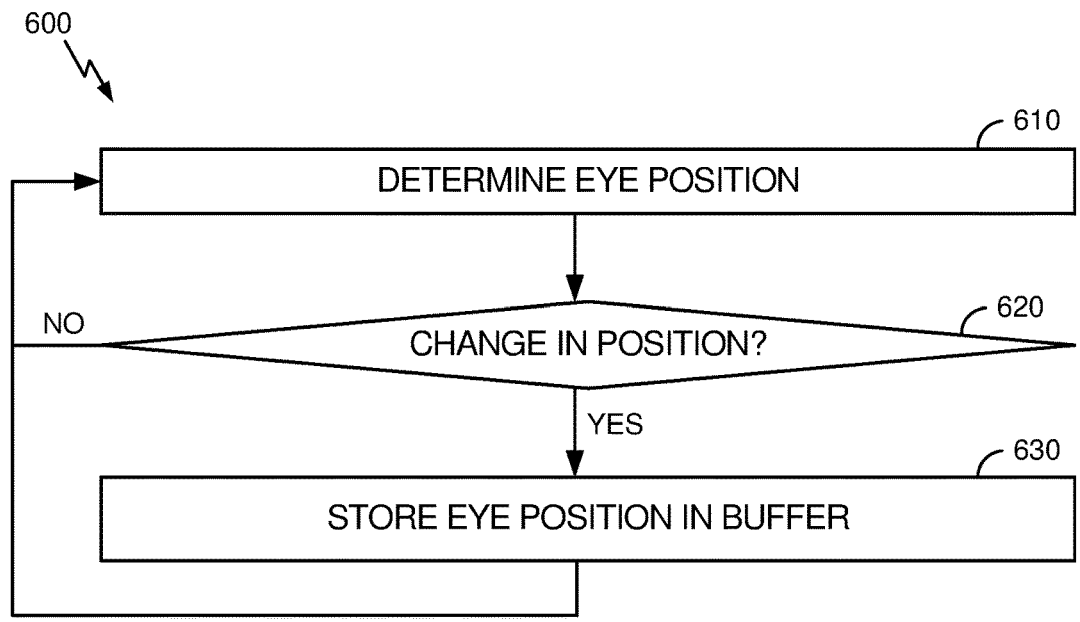
FIG. 6 is an example illustration of tracking eye position and using a shared buffer, consistent with disclosed embodiments.

Referring to FIG. 6, an example process 600 of tracking eye position and using a shared buffer is shown. In various embodiments, the example process 600 can be performed by a computing device, such as the device 100 depicted in FIG. 1, the device 200 depicted in FIG. 2, or a device 900 described below with regard to FIG. 9. In further embodiments, the example process 500 can be performed using one or more processors, such as a CPU, a DSP, and/or a GPU. For example, the process 600 can be performed by the one or more other processors 410 shown in FIG. 4. Additionally or alternatively, in some embodiments, the computing device can be a VR headset, an AR headset, a cellular handset, a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 610, the processor can determine an eye position of a user. For example, the processor can determine the eye position of a user wearing a VR headset using an embedded sensor of the VR headset. As used herein, the eye position of the user may refer to the position of the user's left eye, the position of the user's right eye, or a position that represents positions of both eyes. The sensor may be able to capture an image of the left, right, or both eyes of the user and the processor can determine a corresponding region of the graphics content that corresponds to the user's gaze. For example, if an iris of one eye is directed up and to the left (from the user's perspective), the processor may determine that the user's gaze is in a top left region of the graphics content based on a captured image of the user's eye.

In block 620, the processor can determine if there has been a change in position of the user's eye. For example, if the user's iris has moved from a first position to a second position, and the distance between the first position and the second position is greater than a threshold, the processor may determine that there is a change in position (620:YES). Otherwise, the processor may determine that there is not a change in position (620: NO). In further embodiments, if a position of the user's eye has not been stored in a current session (e.g., a first iteration of the block 610 and the block 620), the processor may proceed as if there has been a change in position (620: YES).

If there has not been a change (620: NO), the example process may return to the block 610. Accordingly, the processor may continuously, near continuously, and/or at set intervals monitor the user's eye position (e.g., measure the user's eye position every 5 milliseconds).

If there has been a change (620: YES), the example process may proceed to block 630. In the block 630, the processor can store the new eye position in a shared buffer. The shared buffer can be, for example, the shared buffer 450 shown in FIG. 4. For example, the processor can store a position value corresponding to the user's iris within the user's eye, the processor can store x, y coordinates corresponding to the user's gaze within the graphics content, the processor can store a region identifier corresponding to the user's gaze within the graphics content, and the like. The example process 600 can then return to the block 610.

Figure 7:
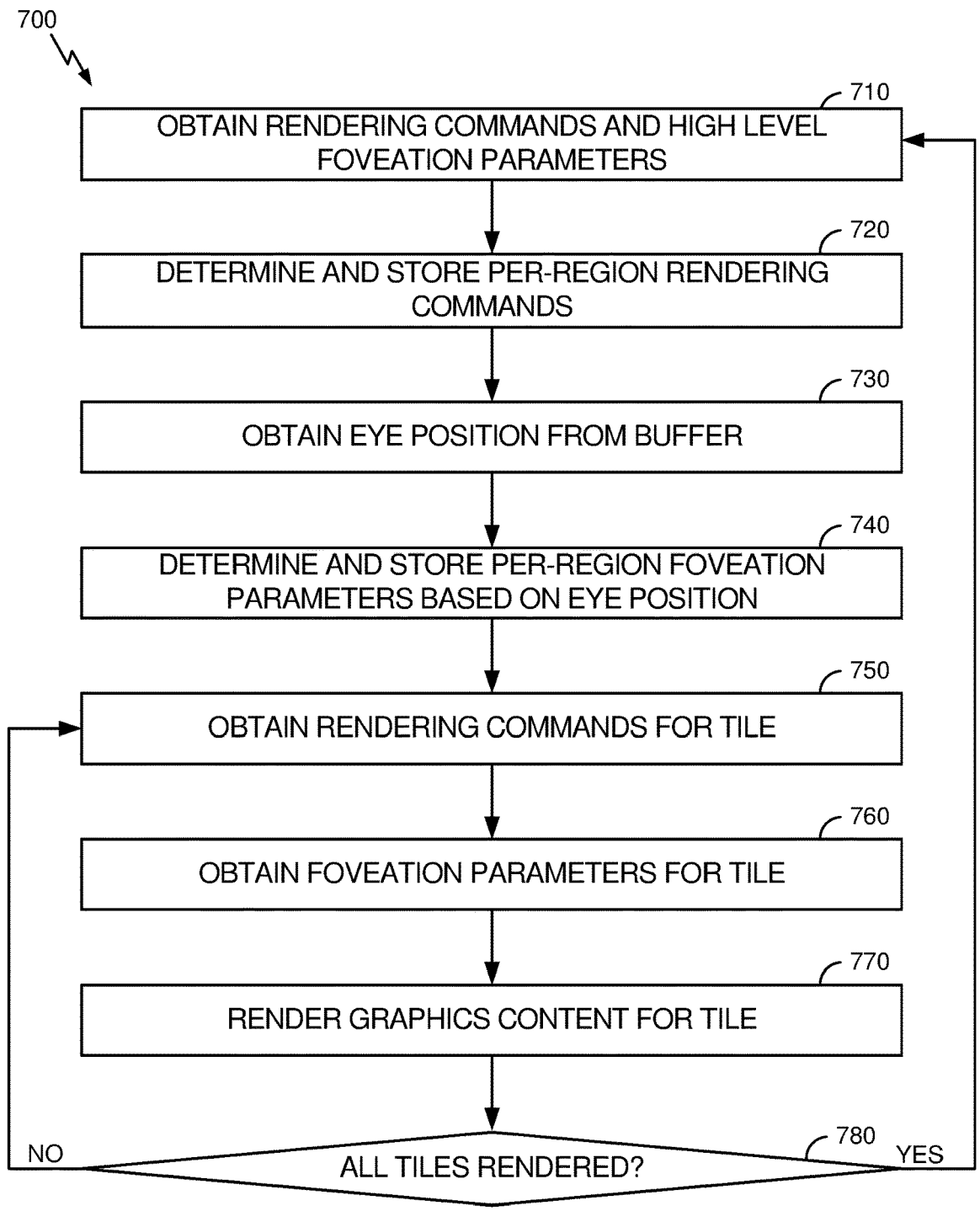
FIG. 7 is an example illustration of foveated rendering based on eye position, consistent with disclosed embodiments.

Referring to FIG. 7, an example process 700 of foveated rendering based on eye position is shown. In various embodiments, the example process 700 can be performed by a computing device, such as the device 100 depicted in FIG. 1, the device 200 depicted in FIG. 2, or a device 900 described below with regard to FIG. 9. In further embodiments, the example process 700 can be performed using one or more processors, such as a GPU, a CPU, and/or a DSP. For example, the process 700 can be performed by the graphics processor 420 shown in FIG. 4. Additionally or alternatively, in some embodiments, the computing device can be a VR headset, an AR headset, a cellular handset, a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 710, the processor can obtain rendering commands and high level foveation parameters for rendering a frame of graphics content (e.g., from another processor). For example, the rendering commands and the high level foveation parameters can be received from a processor that performed the example process 500 shown in FIG. 5. In some embodiments, the high level foveation parameters can be part of the rendering commands.

In block 720, the processor can determine and store per-region rendering commands. In some embodiments, a region can correspond to a tile in tiled rendering of graphics content, as described above. In other embodiments, a region can correspond to multiple tiles and/or a tile can correspond to multiple regions.

For example, the processor can determine that some of the rendering commands obtained in the block 710 correspond to particular region in the graphics content, and segment and store those rendering commands in association with the particular region. As an additional example, the processor can determine that some of the rendering commands correspond to multiple regions, and modify the rendering commands, if needed, to apply to one region and store the rendering commands in association with the one region.

In block 730, the processor can obtain an eye position from a shared buffer (e.g., a position of a left eye, a position of a right eye, or both). The shared buffer can be, for example, the shared buffer 450 shown in FIG. 4 and/or the shared buffer where the eye position is stored by the processor that performs the example process 600 shown in FIG. 6. In the embodiment described with regard to FIG. 7, the eye position obtained in the block 730 may be used for rendering every tile of the frame of graphics content.

In block 740, the processor can determine and store per-region foveation parameters based on the eye position obtained from the shared buffer in block 730 and the high level foveation parameters obtained in block 710.

In some embodiments, the high level foveation parameters can be a table that associates eye positions with equations for each region. For example, the equations could be used to determine and/or render at a particular resolution for each region (e.g., the region corresponding to the eye position will render at a higher resolution based on the equation(s) from the table, and other regions will render at lower resolutions based on the equation(s) from the table). Accordingly, the equations can be retrieved using the eye position as the index value, and the equations can be stored in association with the respective region.

In block 750, the processor can obtain the rendering commands for a tile. In some embodiments, the tile can be associated with a region, part of region, or multiple regions. Accordingly, the processor can obtain the rendering commands associated with the regions associated with the tile that were stored in block 720. If the tile is only associated with part of a region, the processor may modify the rendering commands to correspond to the tile.

In block 760, the processor can obtain the foveation parameters for the tile. Similar to the block 750, the processor can obtain the foveation parameters associated with the regions associated with the tile that were stored in the block 740. If the tile is only associated with part of a region, the processor may modify the per-region foveation parameters to correspond to the tile.

In block 770, the processor can render graphics content for the tile using the rendering commands for the tile and the foveation parameters for the tile. In some embodiments, if the tile is determined to be associated with a foveated region (e.g., determined to be in a user's foveal vision), the foveation parameters for the tile may cause the graphics content to be rendered at a higher resolution, with a higher AA level, with a lower blurring level, using certain filters compared to a non-foveated region, at a higher level of geometric detail, and/or at a higher texture mipmap level. Similarly, in further embodiments, if the tile is determined to be associated with a non-foveated region (e.g., determined to be in a user's peripheral vision), the foveation parameters for the tile may cause the graphics content to be rendered at a lower resolution, with a lower AA level, with a higher blurring level, using certain filters compared to a foveated region, at a lower level of geometric detail, and/or at a lower texture mipmap levels.

In block 780, the processor can determine if all tiles have been rendered. If all tiles have not been rendered (780: NO), the example process 700 can return to the block 750 for processing the next tile. If all tiles have been rendered (780: YES) rendering of the frame of graphics content may be complete, the frame of graphics content can be stored in system memory, and/or the frame of graphics content can be used to adjust pixel values to display the frame of graphics content on the display device of and/or connected to the computing device. Additionally, the example process 700 can return to 710 for processing the next frame of graphics content.

Figure 8:
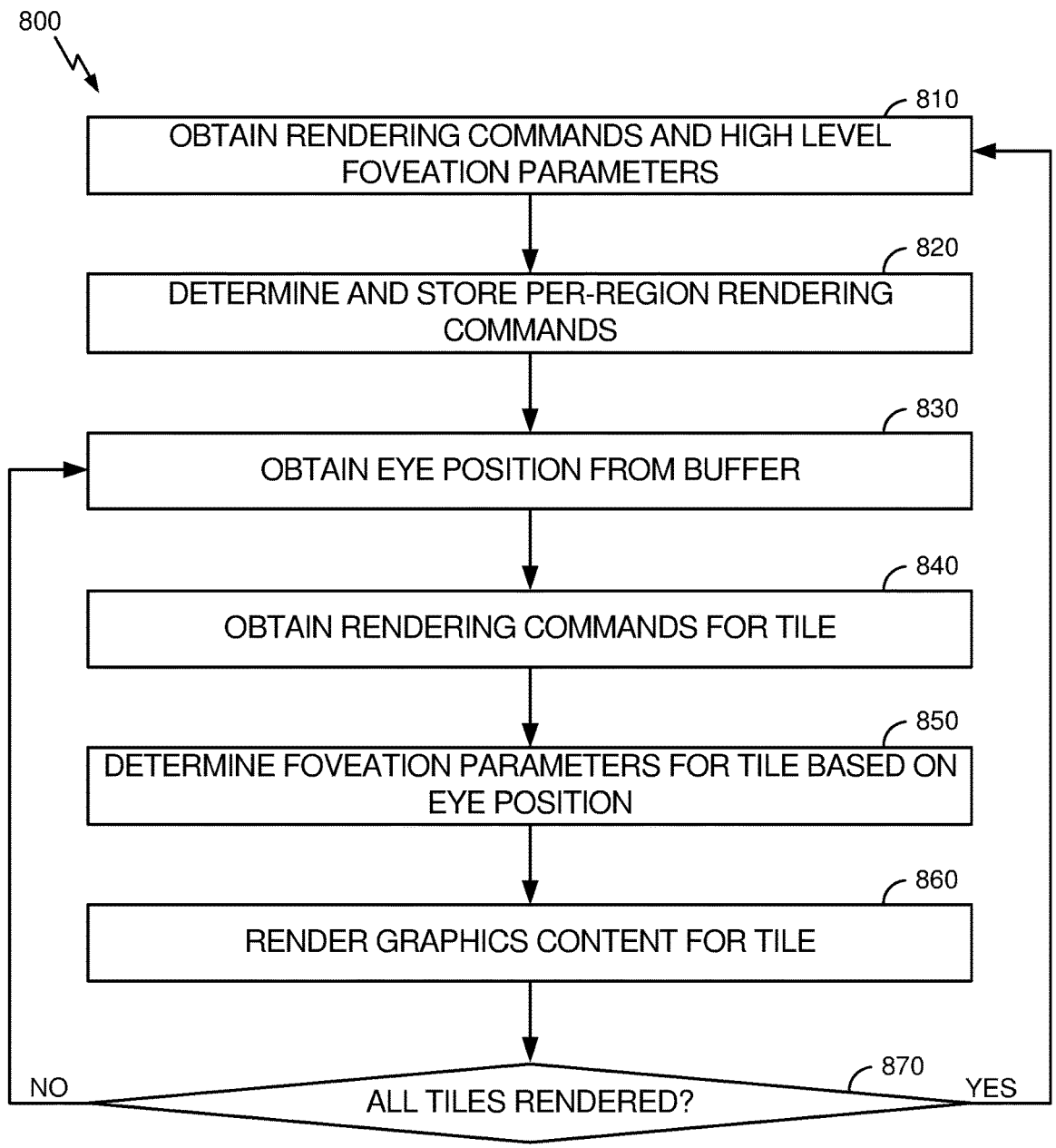
FIG. 8 is an example illustration of foveated rendering based on eye position, consistent with disclosed embodiments.

Referring to FIG. 8, an example process 800 of foveated rendering based on eye position is shown. In various embodiments, the example process 800 can be performed by a computing device, such as the device 100 depicted in FIG. 1, the device 200 depicted in FIG. 2, or a device 900 described below with regard to FIG. 9. In further embodiments, the example process 800 can be performed using one or more processors, such as a GPU, a CPU, and/or a DSP. For example, the process 800 can be performed by the graphics processor 420 shown in FIG. 4. Additionally or alternatively, in some embodiments, the computing device can be a VR headset, an AR headset, a cellular handset, a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 810, the processor can obtain rendering commands and high level foveation parameters for rendering a frame of graphics content from another processor. For example, the rendering commands and the high level foveation parameters can be received from a processor that performed the example process 500 shown in FIG. 5. In some embodiments, the high level foveation parameters can be part of the rendering commands.

In block 820, the processor can determine and store per-region rendering commands. In some embodiments, a region can correspond to a tile in tiled rendering of graphics content, as described above. In other embodiments, a region can correspond to multiple tiles and/or a tile can correspond to multiple regions.

In block 830, the processor can obtain an eye position from a shared buffer (e.g., a position of a left eye, a position of a right eye, or both). The shared buffer can be, for example, the shared buffer 450 shown in FIG. 4 and/or the shared buffer where the eye position is stored by the processor that performs the example process 600 shown in FIG. 6. In the embodiment described with regard to FIG. 8, the eye position obtained in the block 830 may be used for rendering the current tile of the frame of graphics content.

In block 840, the processor can obtain the rendering commands for a tile (i.e., the current tile). In some embodiments, the tile can be associated with a region, part of region, or multiple regions. Accordingly, the processor can obtain the rendering commands associated with the regions associated with the tile that were stored in block 820. If the tile is only associated with part of a region, the processor may modify the rendering commands to correspond to the tile.

In block 850, the processor can determine, for the tile, per-region foveation parameters based on the eye position obtained from the shared buffer in block 830 and the high level foveation parameters obtained in block 810.

In block 860, the processor can render graphics content for the tile using the rendering commands for the tile and the foveation parameters for the tile. In some embodiments, if the tile is associated with a foveated region, the foveation parameters for the tile may cause the graphics content to be rendered at a higher resolution, with a higher AA level, with a lower blurring level, using certain filters compared to a non-foveated region, at a higher level of geometric detail, and/or at a higher texture mipmap level. Similarly, in further embodiments, if the tile is associated with a non-foveated region, the foveation parameters for the tile may cause the graphics content to be rendered at a lower resolution, with a lower AA level, with a higher blurring level, using certain filters compared to a foveated region, at a higher level of geometric detail, and/or at a higher texture mipmap level.

In block 870, the processor can determine if all tiles have been rendered. If all tiles have not been rendered (870: NO), the example process 800 can return to the block 830 for processing the next tile. In the embodiment described with regard to FIG. 8, the processor may retrieve the eye position from the shared buffer in the block 830 multiple times to render the same frame and/or may retrieve the eye position from the shared buffer in the block 830 for each tile that is rendered. Accordingly, if the eye position changes while the frame is still rendering, the tiles that were not rendered before the change can be rendered based on the later updated eye position.

As an example, if the eye position corresponds to a region in the top left tile of the graphics content when the top left tile is rendered, the top left tile may be rendered as a foveated region. If the eye position then changes to a region in the lower right tile of the graphics content before the lower right tile is rendered, the lower right tile may also be rendered as a foveated region.

If all tiles have been rendered (870: YES) rendering of the frame of graphics content may be complete, the frame of graphics content can be stored in system memory, and/or the frame of graphics content can be used to adjust pixel values to display the frame of graphics content on the display device of and/or connected to the computing device. Additionally, the example process 800 can return to 810 for processing the next frame of graphics content.

Figure 9:
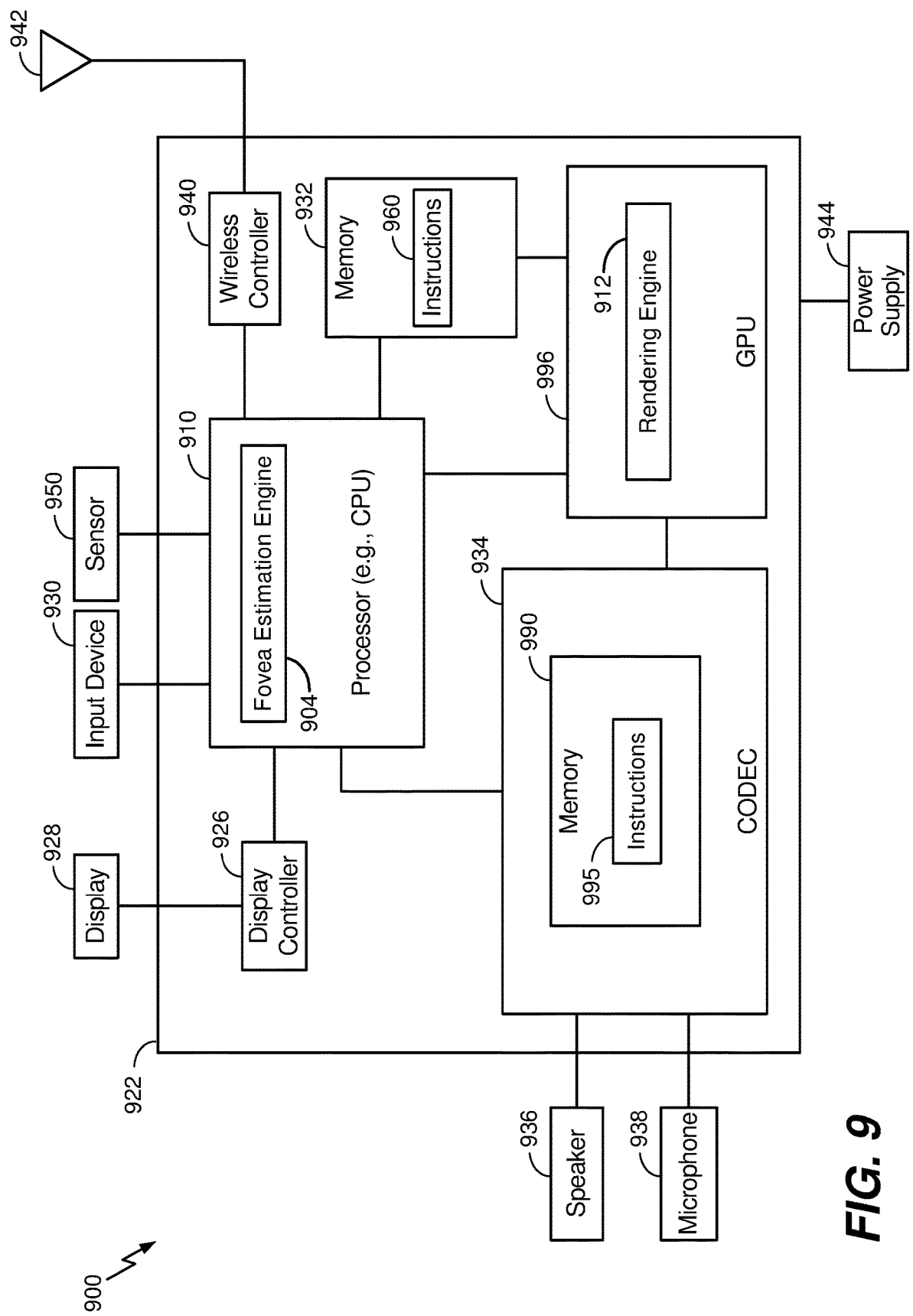
FIG. 9 is an example diagram of an electronic device that can perform foveated rendering, consistent with disclosed embodiments

Regarding to FIG. 9, an example diagram of an electronic device that can perform foveated rendering is depicted and generally designated as an electronic device 900. The electronic device 900 may correspond to a mobile device (e.g., a wireless communication device, such as a cellular handset), a computer (e.g., a server, a laptop computer, a tablet computer, or a desktop computer), an access point, a base station, a wearable electronic device (e.g., a personal camera, a head-mounted display, a VR headset, an AR headset, smart glasses, or a smartwatch), a vehicle control system or console (e.g., an advanced driver assistance system), an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 900 includes one or more processors, such as a processor 910 and a graphics processing unit (GPU) 996. The processor 910 may include a central processing unit (CPU), a digital signal processor (DSP), another processing device, or a combination thereof. In the example of FIG. 9, the processor may include the fovea estimation engine 904 and the GPU 996 may include the rendering engine 912. In other embodiments, the rendering engine 912 may be included in the processor 910 and/or the fovea estimation engine 904 may be included in the GPU 996, etc.

The processor 910 may be coupled to the GPU 996. In an illustrative example, the processor 910 may be configured to communicate with the GPU 996 using graphics application programming interface (API) calls. For example, the GPU 996 may include an API calls analyzer (not shown), and the processor 910 may be configured to provide the API calls to the API calls analyzer during graphics processing performed by the GPU 996.

The electronic device 900 may further include one or more memories, such as a memory 932. The memory 932 may be coupled to the processor 910, to the GPU 996, or to both. The memory 932 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 932 may store instructions 960. The instructions 960 may be executable by the processor 910, by the GPU 996, or by both. In some embodiments, the instructions 960 may instruct the processor 910 and/or the GPU 996 to perform the processes described with regard to FIGS. 5-8.

A coder/decoder (CODEC) 934 can also be coupled to the processor 910. The CODEC 934 may be coupled to one or more microphones, such as a microphone 938. The CODEC 934 may also be coupled to one or more speakers, such as a speaker 936. The CODEC 934 may include a memory 990 storing instructions 995 executable by the CODEC 934.

FIG. 9 also shows a display controller 926 that is coupled to the processor 910 and to a display 928. In some embodiments, the electronic device 900 may further include a wireless controller 940 coupled to an antenna 942. In other embodiments, the electronic device 900 may further include a wired network controller (not shown) coupled to a computer network cable.

The electronic device 900 may further include a sensor 950 (e.g., a camera). The sensor 950 may be any type of sensor configured to capture images of a user's eye(s). The fovea estimation engine 904 may be configured to identify eye position information based on the captured images from the sensor 950.

In a particular example, the processor 910, the GPU 996, the memory 932, the display controller 926, the CODEC 934, and the wireless controller 940 are included in a system-on-chip (SoC) device. Further, an input device 930 and a power supply 944 may be coupled to the SoC device 922. Moreover, in a particular example, as illustrated in FIG. 9, the display 928, the input device 930, the speaker 936, the microphone 938, the antenna 942, the power supply 944, and the sensor 950 are external to the SoC device 922. However, each of the display 928, the input device 930, the speaker 936, the microphone 938, the antenna 942, the power supply 944, and the sensor 950 can be coupled to a component of the SoC device 922, such as to an interface or to a controller.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The foregoing disclosed devices and functionalities may be designed and represented using computer files (e.g. computer files in file formats that include Graphic Database System II (GDSII), GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 900 of FIG. 9.

Although certain examples have been described separately for convenience, it is noted that aspects of such examples may be suitably combined without departing from the scope of the disclosure. For example, the device 100 may be configured to operate based on aspects described with reference to each of FIGS. 2-9. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the example process 500 of FIG. 5, the example process 600 of FIG. 6, the example process 700 of FIG. 7, the example process 800 of FIG. 8, and the like may be initiated, controlled, or performed by a field-programmable gate array (FPGA) device, an application-specific integrated circuit (ASIC), a processing unit such as a CPU, a digital signal processor (DSP), a controller, another hardware device, a firmware device, or a combination thereof. A software module may reside in RAM, MRAM, flash memory, ROM, EPROM, EEPROM, registers, hard disk, a removable disk, a CD-ROM, or any other form of non-transitory storage medium known in the art. An example storage medium is coupled to the processor such that the processor can read information from, and write information to, the storage medium. Additionally or in the alternative, the storage medium may be integral to the processor. The processor and the storage medium may reside in an ASIC. The ASIC may reside in a computing device or a user terminal. Additionally or in the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device for generating graphics content, comprising:
a memory; and
a graphics processing unit (GPU) coupled to the memory configured to:
obtain a rendering command and a high level foveation parameter for a frame of the graphics content;
begin to render a tile, of the frame, corresponding to a region of the graphics content using the rendering command;
obtain, from a buffer shared by a central processing unit (CPU) and the GPU, an eye position of a user after the GPU obtains the rendering command and after the GPU begins to render the tile;
determine a foveation parameter for the region of the graphics content based on the eye position; and
continue to render the tile, of the frame, corresponding to the region of the graphics content using the high level foveation parameter, the foveation parameter, and the rendering command.

2. The device of claim 1, wherein the eye position is used to determine foveation parameters for each tile of a plurality of tiles corresponding to the frame of the graphics content.

3. The device of claim 1, wherein the GPU is future configured to:
obtain a second rendering command for the frame of the graphics content;
obtain a second eye position of the user after rendering the tile;
determine a second foveation parameter for a second region of the graphics content based on the second eye position; and
render a second tile, of the frame, corresponding to the second region of the graphics content using the second foveation parameter and the second rendering command for the frame of the graphics content.

4. The device of claim 1, wherein:
the region is determined to be in the foveal vision of a user; and
the tile is rendered at a higher resolution than other tiles corresponding to the frame of the graphics content based on the foveation parameter.

5. The device of claim 1, wherein:
the region is determined to be in the peripheral vision of a user; and
the tile is rendered at a lower resolution than other tiles corresponding to the frame of the graphics content based on the foveation parameter.

6. The device of claim 1, wherein the foveation parameter corresponds to at least one selected from the group consisting of:
a resolution;
an antialiasing level;
a blurring level;
a filter;
a level of geometric detail; and
a texture mipmap level.

7. The device of claim 1, wherein the GPU obtains the rendering command from the CPU.

8. The device of claim 1, wherein the GPU obtains the rendering command from a processor that is different than the GPU and the CPU.

9. The device of claim 1, wherein the GPU is further configured to generate the frame of the graphics content based on a plurality of tiles comprising the tile, wherein the frame of the graphics content is displayed on a virtual reality headset or a cellular handset.

10. The device of claim 9, wherein the device comprises the virtual reality headset or the cellular handset.

11. A method for generating graphics content comprising:
obtaining, using a graphics processing unit (GPU), a rendering command and a high level foveation parameter for a frame of the graphics content;
begin rendering, using the GPU, a tile, of the frame, corresponding to a region of the graphics content using the rendering command;
obtaining, from a buffer shared by a central processing unit (CPU) and the GPU, an eye position of a user after obtaining the rendering command and after beginning to render the tile;
determining a foveation parameter for the region of the graphics content based on the eye position; and
continue rendering, using the GPU, the tile, of the frame, corresponding to the region of the graphics content using the high level foveation parameter, the foveation parameter and the rendering command.

12. The method of claim 11, wherein the eye position is used to determine foveation parameters for each tile of a plurality of tiles corresponding to the frame of the graphics content.

13. The method of claim 11, further comprising:
obtaining a second rendering command for the frame of the graphics content;
obtaining a second eye position of the user after rendering the tile;
determining a second foveation parameter for a second region of the graphics content based on the second eye position; and
rendering a second tile, of the frame, corresponding to the second region of the graphics content using the second foveation parameter and the second rendering command for the frame of the graphics content.

14. The method of claim 11, wherein:
the region is determined to be in the foveal vision of a user; and
the tile is rendered at a higher resolution than other tiles corresponding to the frame of the graphics content based on the foveation parameter.

15. The method of claim 11, wherein:
the region is determined to be in the peripheral vision of a user; and the tile is rendered at a lower resolution than other tiles corresponding to the frame of the graphics content based on the foveation parameter.

16. The method of claim 11, wherein the foveation parameter corresponds to at least one selected from the group consisting of:
a resolution;
an antialiasing level;
a blurring level;
a filter;
a level of geometric detail; and
a texture mipmap level.

17. The method of claim 11, wherein the GPU obtains the rendering command from the CPU.

18. The method of claim 11, wherein the GPU obtains the rendering command from a processor that is different than the GPU and the CPU.

19. The method of claim 11, further comprising:
generating the frame of the graphics content based on a plurality of tiles comprising the tile; and
displaying the frame of the graphics content on a virtual reality headset or a cellular handset.

20. A non-transitory computer-readable medium for generating graphics content, the non-transitory computer-readable medium storing a program containing instructions that, when executed by a processor of a device, cause the device to perform a method comprising:
obtaining, using a graphics processing unit (GPU), a rendering command and a high level foveation parameter for a frame of the graphics content;
begin rendering a tile, of the frame, corresponding to a region of the graphics content using the rendering command;
obtaining, from a buffer shared by a central processing unit (CPU) and the GPU, an eye position of a user after obtaining the rendering command and after beginning to render the tile;
determining a foveation parameter for the region of the graphics content based on the eye position; and
continue rendering, the tile, of the frame, corresponding to the region of the graphics content using the high level foveation parameter, the foveation parameter and the rendering command.

21. The computer readable medium of claim 20, wherein the foveation parameter corresponds to at least one selected from the group consisting of:
a resolution;
an antialiasing level;
a blurring level;
a filter;
a level of geometric detail; and
a texture mipmap level.

22. The computer readable medium of claim 20, wherein the GPU obtains the rendering command from the CPU.

* * * * *